(12) United States Patent
Constantinou et al.

(10) Patent No.: US 9,501,496 B2
(45) Date of Patent: Nov. 22, 2016

(54) NOTE ATLAS

(71) Applicant: Evernote Corporation, Redwood City, CA (US)

(72) Inventors: Phil Constantinou, San Francisco, CA (US); Gabriel Campodonico, Oakland, CA (US); John (Josh) Mangum, San Francisco, CA (US)

(73) Assignee: Evernote Corporation, Redwood City, CA (US)

( * ) Notice: Subject to any disclaimer, the term of this patent is extended or adjusted under 35 U.S.C. 154(b) by 189 days.

(21) Appl. No.: 13/905,422

(22) Filed: May 30, 2013

(65) Prior Publication Data

US 2014/0032554 A1    Jan. 30, 2014

Related U.S. Application Data

(60) Provisional application No. 61/677,085, filed on Jul. 30, 2012.

(51) Int. Cl.
     *G06F 17/30*      (2006.01)
     *G06F 7/00*      (2006.01)

(52) U.S. Cl.
     CPC .............................. *G06F 17/30241* (2013.01)

(58) Field of Classification Search
     USPC ........................................................ 707/737
     See application file for complete search history.

(56) References Cited

U.S. PATENT DOCUMENTS

| | | | |
|---|---|---|---|
| 8,381,088 B2 | 2/2013 | Kikin-Gil et al. | |
| 2005/0203922 A1* | 9/2005 | Uhlir | A63F 13/10 |
| 2007/0149214 A1* | 6/2007 | Walsh | H04L 12/1859 |
| | | | 455/456.1 |
| 2009/0313301 A9* | 12/2009 | Reed | G06F 17/30038 |
| 2010/0318291 A1* | 12/2010 | Gluck | G01C 21/367 |
| | | | 701/532 |
| 2011/0040657 A1* | 2/2011 | Roswell | G06F 17/3089 |
| | | | 705/27.1 |
| 2011/0143775 A1* | 6/2011 | Liu | G06F 17/30241 |
| | | | 455/456.3 |
| 2012/0084000 A1* | 4/2012 | Wang | G01C 21/343 |
| | | | 701/426 |
| 2013/0063456 A1* | 3/2013 | Blanco | G06T 1/60 |
| | | | 345/530 |
| 2013/0117327 A1* | 5/2013 | Chmiel | G06F 17/30241 |
| | | | 707/802 |

* cited by examiner

*Primary Examiner* — Kuen Lu

(74) *Attorney, Agent, or Firm* — Muirhead and Saturnelli, LLC

(57) ABSTRACT

Presenting database items includes providing a plurality of clusters, where each of the clusters is formed by grouping database items according to location information associated therewith, creating a plurality of geographic elements based on the clusters, and presenting the geographic elements to a user using a note atlas that represents all of the geographic elements corresponding to a set of the database items, where indicators of corresponding clusters are provided with each of the geographic elements. A quantity of database items may be provided with each of the corresponding clusters. The note atlas may show at least two levels of detail corresponding to a world level of detail, a points of interest level of detail and a city level of detail. Points of interest may be determined by having a user provide points of interest on a map.

38 Claims, 10 Drawing Sheets

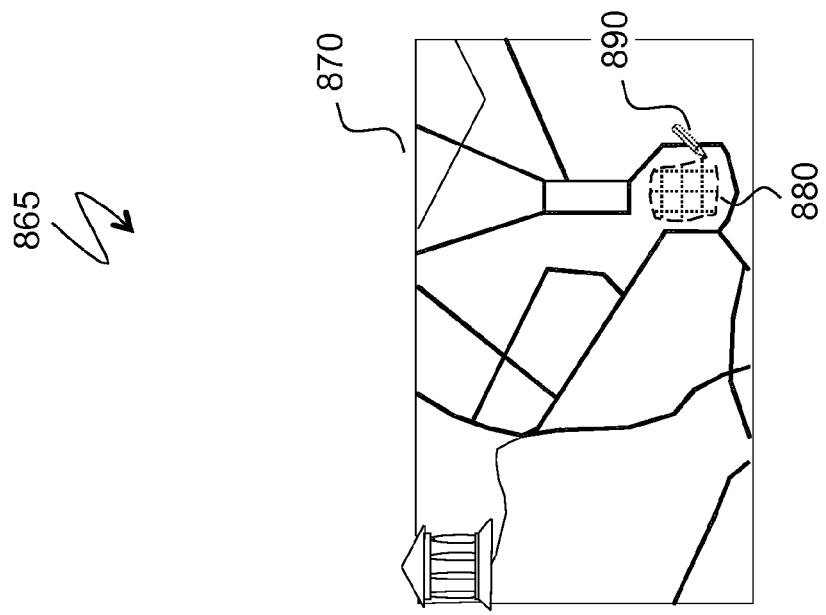
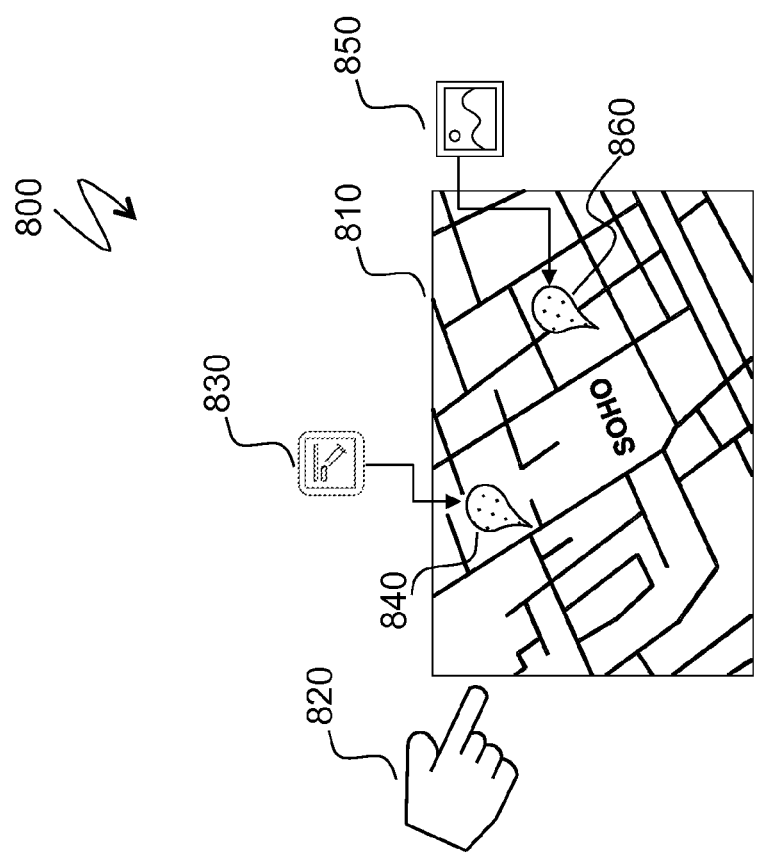
FIG. 8A
FIG. 8B

NOTE ATLAS

CROSS-REFERENCE TO RELATED APPLICATIONS

This application claims priority to U.S. Prov. App. No. 61/677,085, filed Jul. 30, 2012, and entitled "ATLAS OF PERSONAL NOTES", which is incorporated herein by reference.

TECHNICAL FIELD

This application is directed to the field of presenting, extracting, and analyzing information, especially in conjunction with location aware content management systems.

BACKGROUND

Location awareness has become a useful feature of personal, business and social applications. It is utilized in search, personal content management, entertainment and many other classes of software and online services. There are multiple ways of capturing positioning information on connected desktops and on mobile devices including GeoIP and GPS. These techniques may place documents, personal notes and other types of content on a map and enable multiple location-aware mobile services. Numerous electronic mapping components and features are available from Google Maps, OpenStreetMap, Bing Maps, deCarta Maps and other vendors. All such services support multiple zooming levels on high-resolution aerial or satellite images, several map views, including roadmap, satellite, terrain, and, in some cases, street view, directions and many other features, such as, for example, "search nearby" in Google Maps. Social and mass market location aware and location centric applications, such as Facebook, Waze, Yelp, Foursquare, OpenTable, underscore different aspects of dynamically updated and shared mapping capabilities and offer numerous applications of location awareness.

With all advances in mass-market mapping technologies and user experiences with location-aware products and online services, there are still certain shortcomings in existing approaches to visualization and usage of mapping information. This is particularly true for personal content management systems. Zoom levels for maps labeled with personal information (locations of user content capturing sessions) are often too generic and do not display recognizable and memorable geographical objects. Zooming from a world view to specific locations of user interest is non-intuitive, since it may be based on specific label locations rather than on relations between label locations and well-defined and comprehensible geographical objects; geographical zooming and Points of Interest (POIs) are disconnected. Additionally, there is a deficiency of easy and user-friendly methods to reflect time-and-space information on the map, such as reconstructing trip dynamics based on labeled locations. Users of location-aware systems may have difficulty adding labels manually, directly on the map as a follow-up to their trips, meetings or other encounters or extract location info directly from their content.

Accordingly, there is a growing need in user-friendly methods of location-aware organization and mapping of content in personal and business wide content management systems.

SUMMARY OF THE INVENTION

According to the system described herein, presenting database items includes providing a plurality of clusters, where each of the clusters is formed by grouping database items according to location information associated therewith, creating a plurality of geographic elements based on the clusters, and presenting the geographic elements to a user using a note atlas that represents all of the geographic elements corresponding to a set of the database items, where indicators of corresponding clusters are provided with each of the geographic elements. A quantity of database items may be provided with each of the corresponding clusters. The note atlas may show at least two levels of detail corresponding to a world level of detail, a points of interest level of detail and a city level of detail. Points of interest may be determined by having a user provide points of interest on a map. The world level of detail may include a geographic element for the entire world that corresponds to all of the database items and at least one geographic element for a particular city that corresponds to a cluster containing at least one of the database items for the particular city. The note atlas may include an additional viewing pane that shows a navigable and zoomable map and shows clusters of database items corresponding to locations of the map. The additional pane may provide direct access to database items. A user selecting a particular one of the database items may cause a content management application that manages the database items to open. At least some of the geographic elements may show a landmark with an iconic image corresponding to location information associated with the geographic elements. At least some of the geographic elements may be at least partially hidden when viewing the note atlas. At least some of the geographic elements may be searched to provide a subset of geographic elements corresponding to the search. The geographic elements may be atlas cards that represent locations corresponding to points of interest and/or natural location areas of the database items. The natural location areas may include cities. The database items may correspond to notes having location information and the location information may be provided using manual entry, automatic entry, and/or semi-automatic entry based on content of the notes. Manual entry may be provided by having a user select a location on a map after selecting at least one database item. Clusters corresponding to a particular sequence of times and having locations that correspond to a user travelling from a first location to a second location may be grouped together and interconnected to form a user trip. User approval may be solicited for at least one of the user trips. The database items may be provided by an application having functionality corresponding to cloud-based content management, mobile content management, and/or desktop content management. The application may be a user contact management system or a user note management system.

According further to the system described herein, a non-transitory computer-readable storage medium contains software that presents database items. The software includes executable code that provides a plurality of clusters, where each of the clusters is formed by grouping database items according to location information associated therewith, executable code that creates a plurality of geographic elements based on the clusters, and executable code that presents the geographic elements to a user using a note atlas that represents all of the geographic elements corresponding to a set of the database items, where indicators of corresponding clusters are provided with each of the geographic elements. A quantity of database items may be provided with each of the corresponding clusters. The note atlas may show at least two levels of detail corresponding to a world level of detail, a points of interest level of detail and a city level of detail. Points of interest may be determined by having a user provide points of interest on a map. The world level of detail may include a geographic element for the entire world that corresponds to all of the database items and at least one geographic element for a particular city that corresponds to a cluster containing at least one of the database items for the particular city. The note atlas may include an additional viewing pane that shows a navigable and zoomable map and shows clusters of database items corresponding to locations of the map. The additional pane may provide direct access to database items. A user selecting a particular one of the database items may cause a content management application that manages the database items to open. At least some of the geographic elements may show a landmark with an iconic image corresponding to location information associated with the geographic elements. At least some of the geographic elements may be at least partially hidden when viewing the note atlas. At least some of the geographic elements may be searched to provide a subset of geographic elements corresponding to the search. The geographic elements may be atlas cards that represent locations corresponding to points of interest and/or natural location areas of the database items. The natural location areas may include cities. The database items may correspond to notes having location information and the location information may be provided using manual entry, automatic entry, and/or semi-automatic entry based on content of the notes. Manual entry may be provided by having a user select a location on a map after selecting at least one database item. Clusters corresponding to a particular sequence of times and having locations that correspond to a user travelling from a first location to a second location may be grouped together and interconnected to form a user trip. User approval may be solicited for at least one of the user trips. The database items may be provided by an application having functionality corresponding to cloud-based content management, mobile content management, and/or desktop content management. The application may be a user contact management system or a user note management system.

The proposed system clusters user-defined and location-aware units of personal, shared or business wide content (notes) by geographic locations and displays note labels with quantities in an atlas of cards, where each card is corresponding to a memorable and visually representative public or user-defined geographical area. The resulting atlas-driven display provides easy memorizing and subsequent recalling and retrieval of notes based on placement of the notes on the map.

Accordingly, each personal, shared or business wide content collection (a notebook) acquires an associated atlas view where personal, shared and business wide information in the notes is presented on the atlas cards with intuitive geographical units. Cards in an atlas may represent several geographical levels of details (LODs), such as:

World>Country>Region>City>District.

There may be two key supported units for the atlas cards: cities and user-defined points-of-interest (POIs). Cities are considered the most recognizable geographical objects, and one implementation of the atlas of notes includes one card for the world and the remaining cards being city cards. Each city may be represented by a series of recognizable maps in different styles (traditional, terrain, 3 D, with or without landmark objects) and some of the atlas cards may display associated iconic images, such as the Eiffel Tower for Paris, France, the Acropolis of Athens for Athens, Greece or the US Capitol Building for Washington, D.C., United States, etc.

The concept of notes atlas and its cards is related to the notion of Points of Interest (POIs). POIs may form a geographical hierarchy; for example, a POI MGM Grand Hotel may be part of another POI Las Vegas Strip, which, in its turn, may belong to the Las Vegas City in the main hierarchy. Adding these POIs to the LOD hierarchy may lead to a sequence World>Americas>North America>USA>Nevada>Las Vegas>Strip>MGM Grand Hotel.

There may be three main sources of location information associated with notes:

Automatically detected note locations via GPS, GeoIP and other direct means, which may be embedded in a user's hardware.

Manually entered note locations entered by a user on a map.

Note locations semi-automatically extracted from the content, such as a postal address or other textual geographical info, which may be approved by the user.

An atlas of notes for a user notebook may be automatically generated by the system based on note location, system and user defined geographical hierarchy, set of common and custom POIs, and selected zoom level. In some embodiments, in addition to utilizing or selecting objects from existing POI directories (such as POI Factory or POI Plaza), users may be able to define their own POIs by drawing or otherwise indicating them on maps supplied by the system.

Users may customize the atlas by hiding and pulling back some cards that carry existing notes (hidden cards may be shown as a stack and may be searchable) or by calling up any card and pinning one or more notes to certain location(s) on the card.

The note atlas may display cards and note count information not only for a full set of notes captured for each location, but also for subsets of notes, such as, for example, search results or notes restricted by time intervals.

Based on space and time information contained in notes, the note atlas may apply dynamic mapping capabilities. For example, by analyzing groups of notes taken within a short period of time (week, month) in close geographical locations, the system may detect and show a travel path of a user.

BRIEF DESCRIPTION OF THE DRAWINGS

Embodiments of the system described herein will now be explained in more detail in accordance with the figures of the drawings, which are briefly described as follows.

FIGS. 8A-8B schematically illustrate manual addition of note locations and of custom POIs, according to an embodiment of the system described herein.

DETAILED DESCRIPTION OF VARIOUS EMBODIMENTS

The system described herein provides a method and process for building and presenting to users a note atlas: an intuitive and easy to memorize way of mapping personal, shared and business wide note collections. The system provides different techniques for capturing note locations, as explained elsewhere herein; for defining custom locations (POIs) and including them in a Level of Detail (LOD) hierarchy; for adding iconic images to atlas cards; for accessing mapped notes from atlas cards; and for dynamic mapping of user trips. The system may replace a traditional mapping approach with a cohesive set of well-defined note locations.

Figure 1:
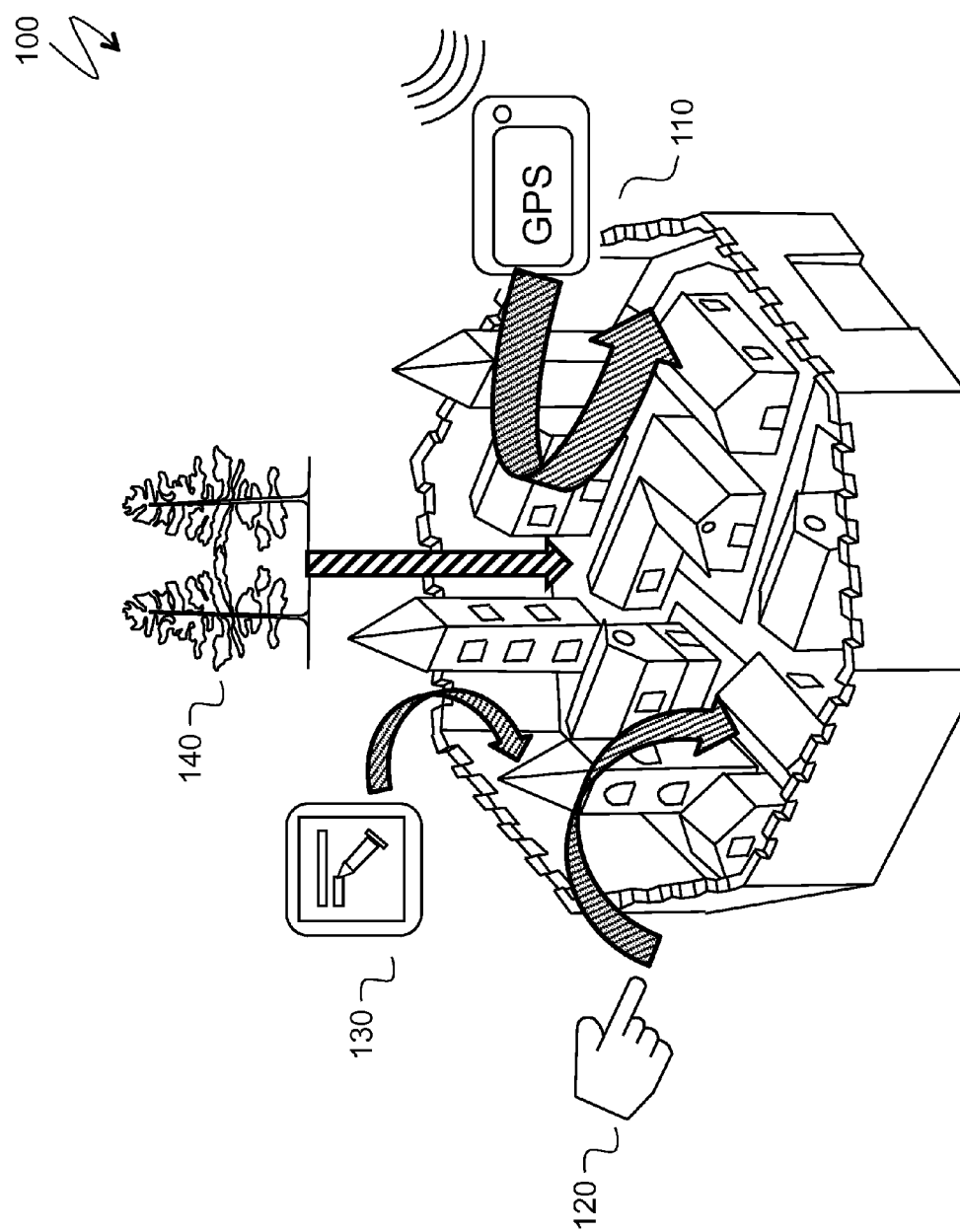
FIG. 1 is a schematic illustration of different methods of defining location information for notes, according to an embodiment of to the system described herein.

FIG. 1 is a schematic illustration 100 of different techniques for defining location info for notes. The notes are database items that correspond to a collection of data created by one or more users using, for example, products provided by the Evernote Corporation of Redwood City, Calif. The system described herein may be adapted to work with any cloud-based, mobile, and/or desktop personal and/or business-wide content management application or with a any type of application that is provided with content management functionality. The system described herein may be adapted to provide enhanced location functionality for a user contact management system, such as such as user contact management software provided by the Microsoft Corporation of Redmond, Wash. in the Microsoft Office® software suite. For example, location information may be stored with contacts used with Outlook® messaging software. In such a case, a user may construct and/or edit an electronic contact entry in a conventional fashion (e.g., modify text fields according to instructions provided by the manufacturer), add location information, and then use the location information stored with the electronic contact information according to the system described herein. It is also possible to provide location information with notes used with OneNote® software also provided by the Microsoft Corporation of Redmond, Wash.

An automatic technique 110 of defining location info for notes involves a location detecting device, such as a GPS or a use of GeoIP over Internet connection. A manual technique 120 defines note location by direct pinning by a user of a location on a map provided by the system, as explained in more details elsewhere herein. A semi-automatic technique 130 extracts location data from the note text when such information is present in a note; for example, a note may include city name(s), postal address(es), Point(s) of Interest (POIs), etc. Such information may be provided for user approval of relevance of the extracted location data to mapping of a particular note. Additionally, the illustration 100 schematically shows a custom POI 140 added to a city map, as explained in more details elsewhere herein.

Figure 2:
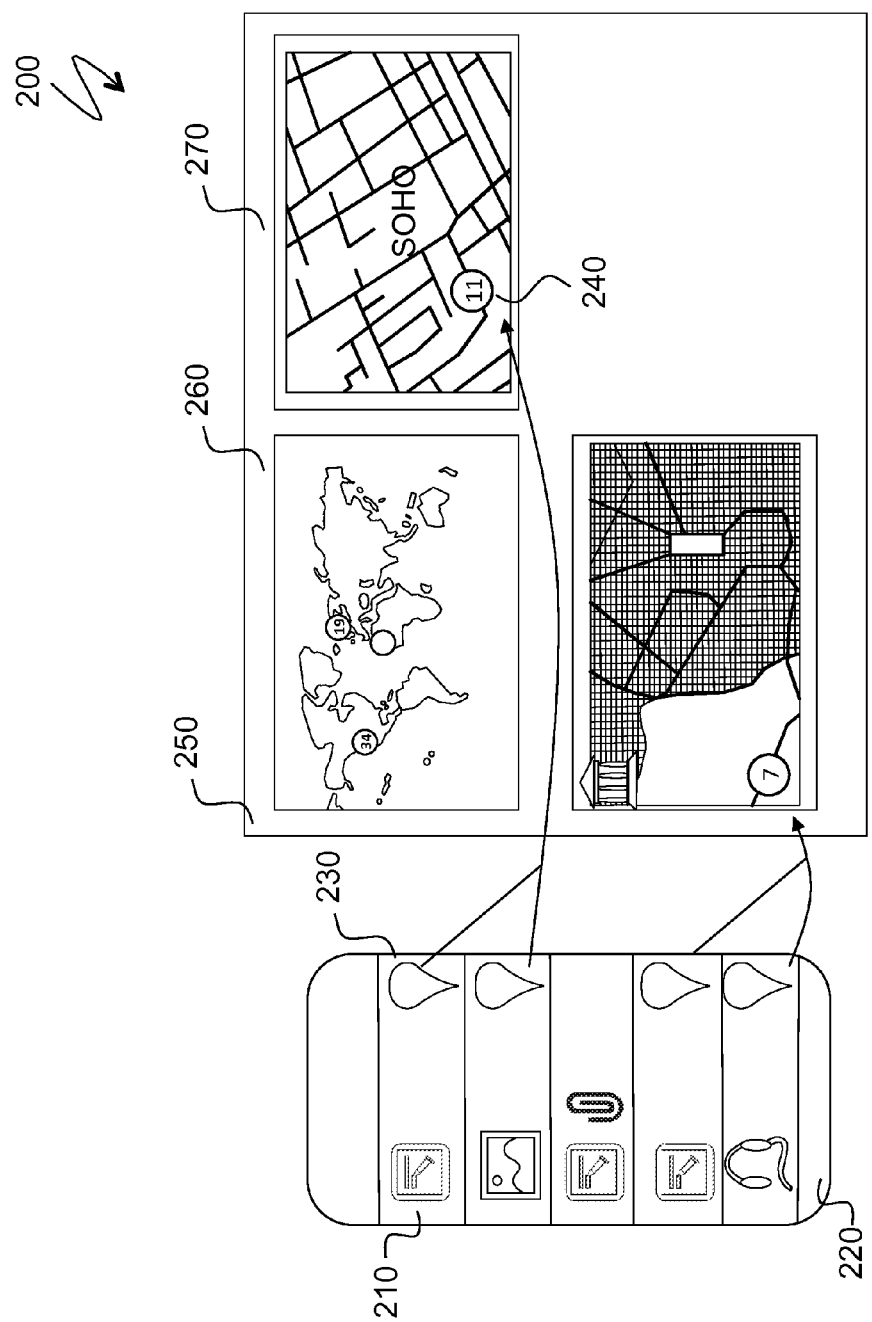
FIG. 2 is a schematic illustration of the process of building of a note atlas from a content collection, according to an embodiment of the system described herein.

FIG. 2 is a schematic illustration 200 of a process for building a note atlas from a content collection. The collection may be a personal content database or a shared or a business wide collection of data. Notes 210 from a content collection 220 may be supplied with location information 230, obtained via one or more techniques illustrated in conjunction with FIG. 1, discussed above. Locations may be grouped into clusters based on, for example, natural location areas, such as cities, city areas or POIs. The quantities of notes 240 in each such cluster may be calculated. Note clusters may be displayed in a note atlas 250; in an embodiment illustrated in FIG. 2, there are two LODs: a world level 260, which shows all note clusters for a particular notebook, and a city level 270.

Figure 3:
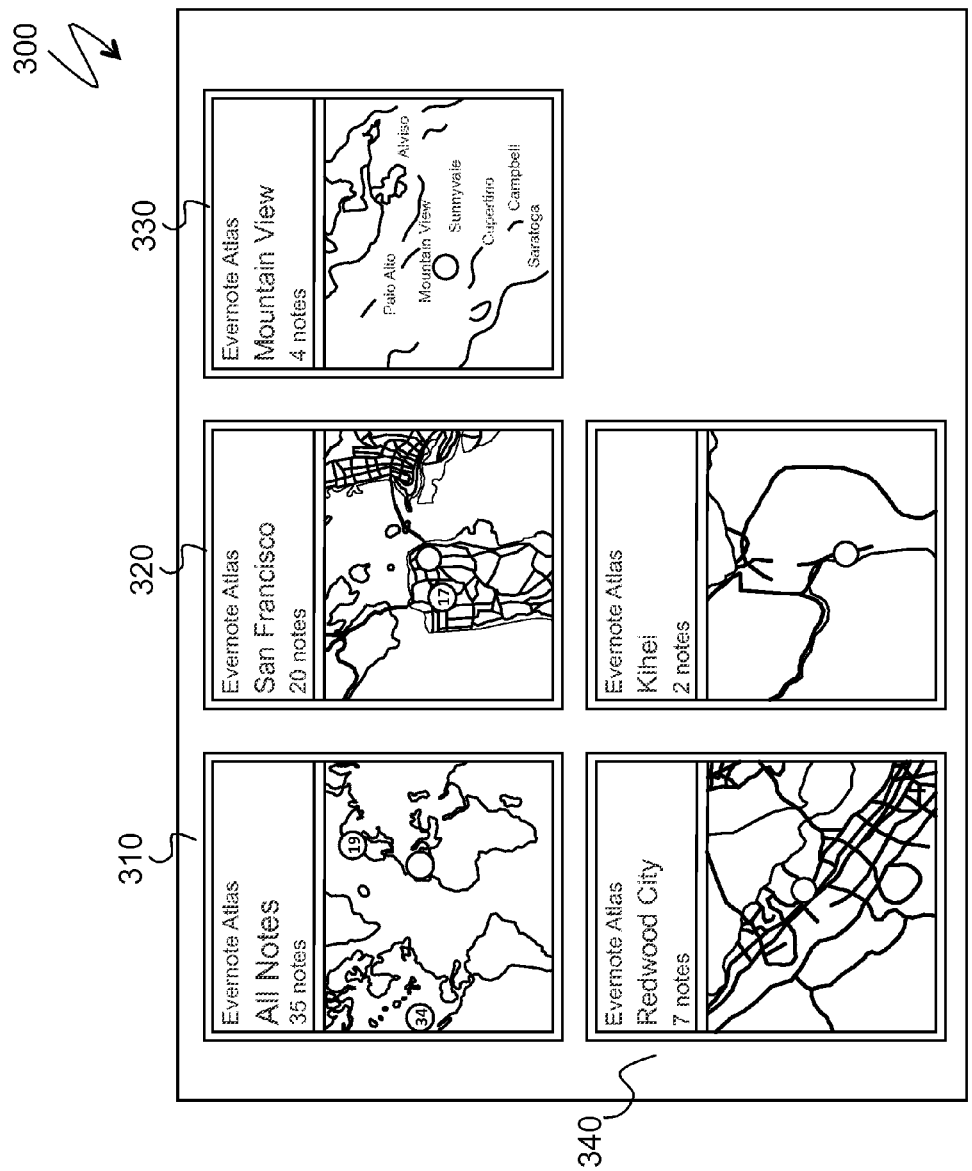
FIG. 3 is a schematic illustration of a world and city based note atlas with additional levels of details, according to an embodiment of the system described herein.

FIG. 3 is a schematic illustration of a world-and-city based note atlas 300 with additional levels of details and presentation styles. Similarly to FIG. 2, a first card in the note atlas 300 is a world level card 310 showing all note clusters. A second card 320 is a city card for San Francisco, Calif. The second card 320 has a total of twenty notes, as provided in a note header thereof. However, the system may detect two distinct note-taking locations within the city and present them as two additional clusters with, respectively, seventeen and three notes corresponding to the twenty notes of the second cluster 320. For example, one of the additional locations might be an office and another one a nearby café. A third atlas card 330 shows four notes taken in Mountain View, Calif. in the context of nearby Silicon Valley cities, from Palo Alto in the northwest side to Saratoga and Campbell in the southeast corresponding to different parts of the card 330. A subsequent card 340 returns to the city map, showing seven notes taken in Redwood City, Calif. on a city map. The system may choose particular presentation styles based on many factors, such as a quantity of notes in a cluster, a pre-defined LOD hierarchy and user preferences between different levels of details. The system provides a relatively compact yet intuitive display of mapping information.

Figure 4:
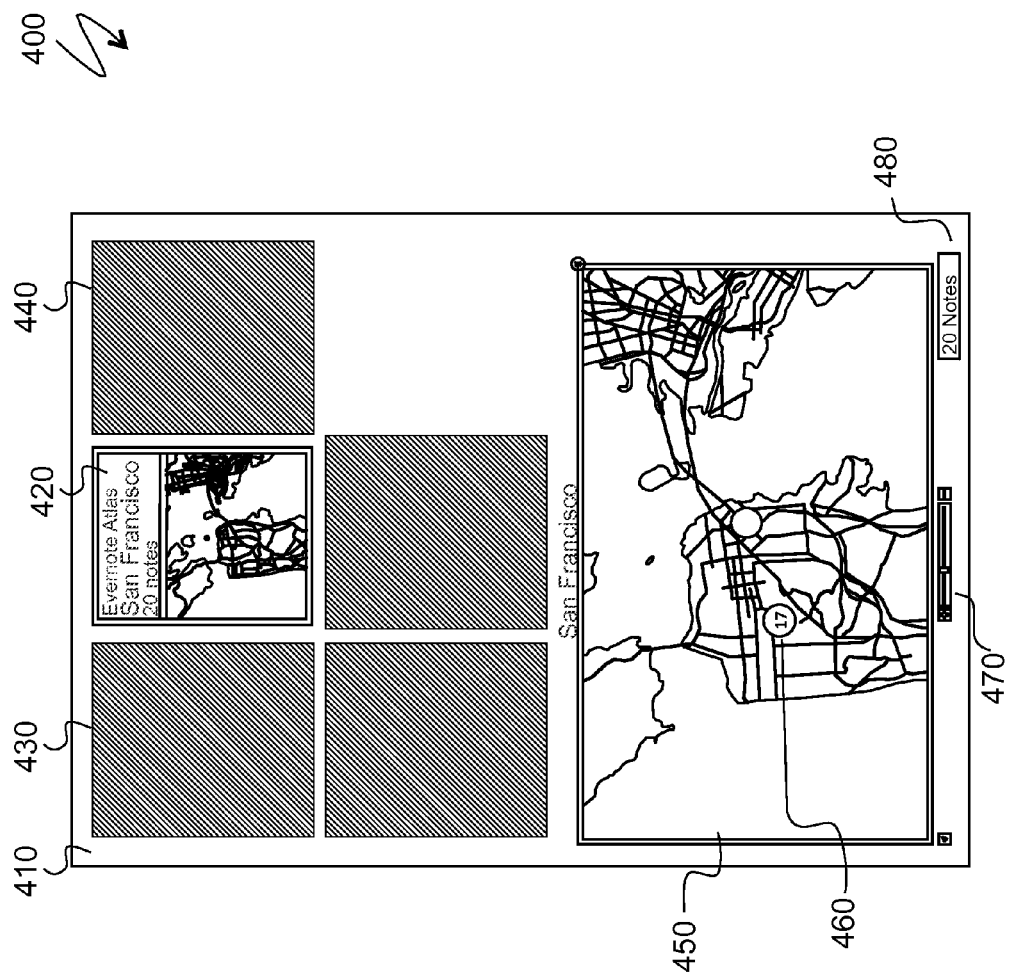
FIG. 4 is a schematic illustration of zoom levels and note access from an atlas of notes, according to an embodiment of the system described herein.

FIG. 4 is a schematic illustration 400 of zoom levels and note access from a note atlas. An atlas 410 is shown with a San Francisco city atlas card 420, similar to the card 320 presented in FIG. 3 and discussed above. A world card 430 and other city cards 440 are dashed out to facilitate the discussion herein, but actually show the world view and other city views as described elsewhere herein. The atlas 410 is supplied with an additional viewing pane 450, which may open when a user taps on an atlas card. The additional viewing pane 450 may be a traditional map zoom view displaying note clusters 460, with a zoom level scale 470. The pane 450 may also be used for direct access to notes so that, for example, when a user taps on a note access button 480, all twenty notes belonging to the clusters depicted on the pane 450 may be opened in the content management application.

Figure 5:
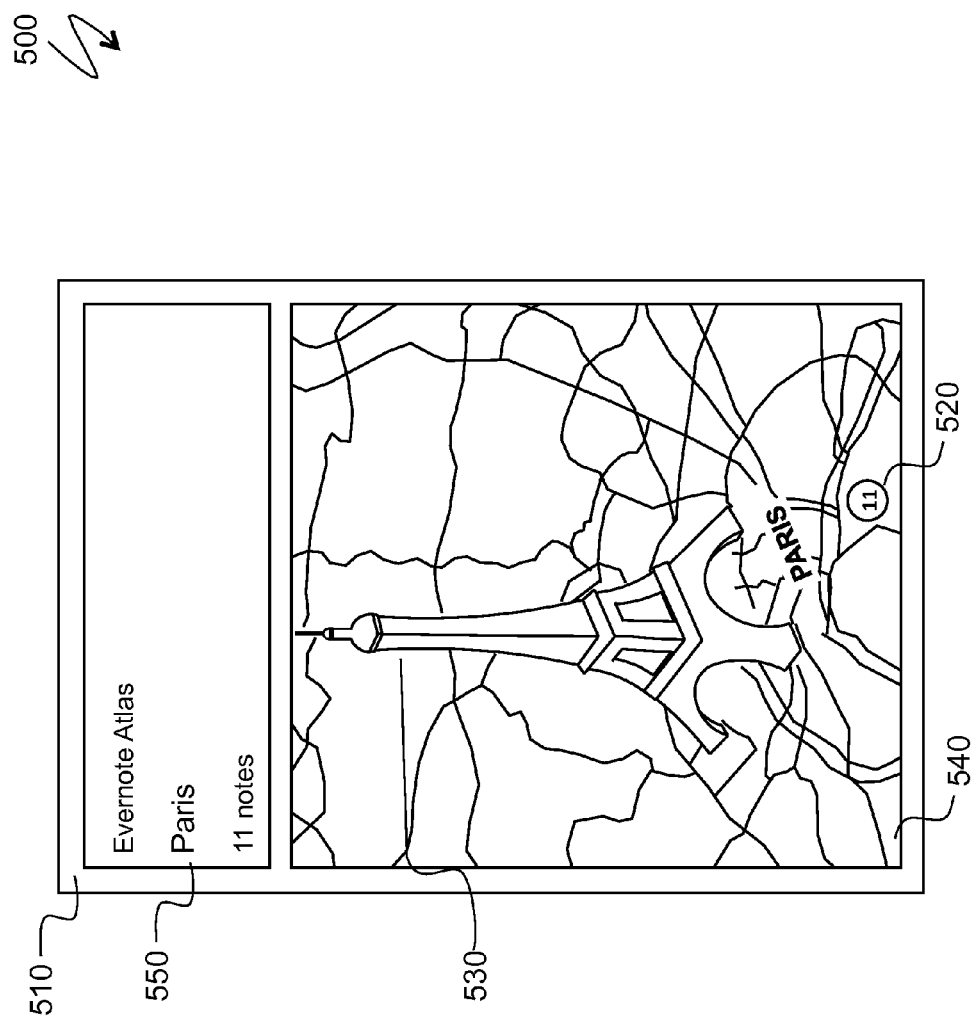
FIG. 5 is a schematic illustration of an atlas card with a landmark, according to an embodiment of the system described herein.

FIG. 5 is a schematic illustration 500 of an atlas card with a landmark shown as an iconic image on the card for easy recognition. In the example of FIG. 5, an atlas card 510 shows a cluster of notes 520 taken in Paris, France. An image of the Eiffel Tower landmark 530 is shown in a larger size on a city map 540, so a user may be able to correctly associate the card without even reading a card header 550.

Figure 6:
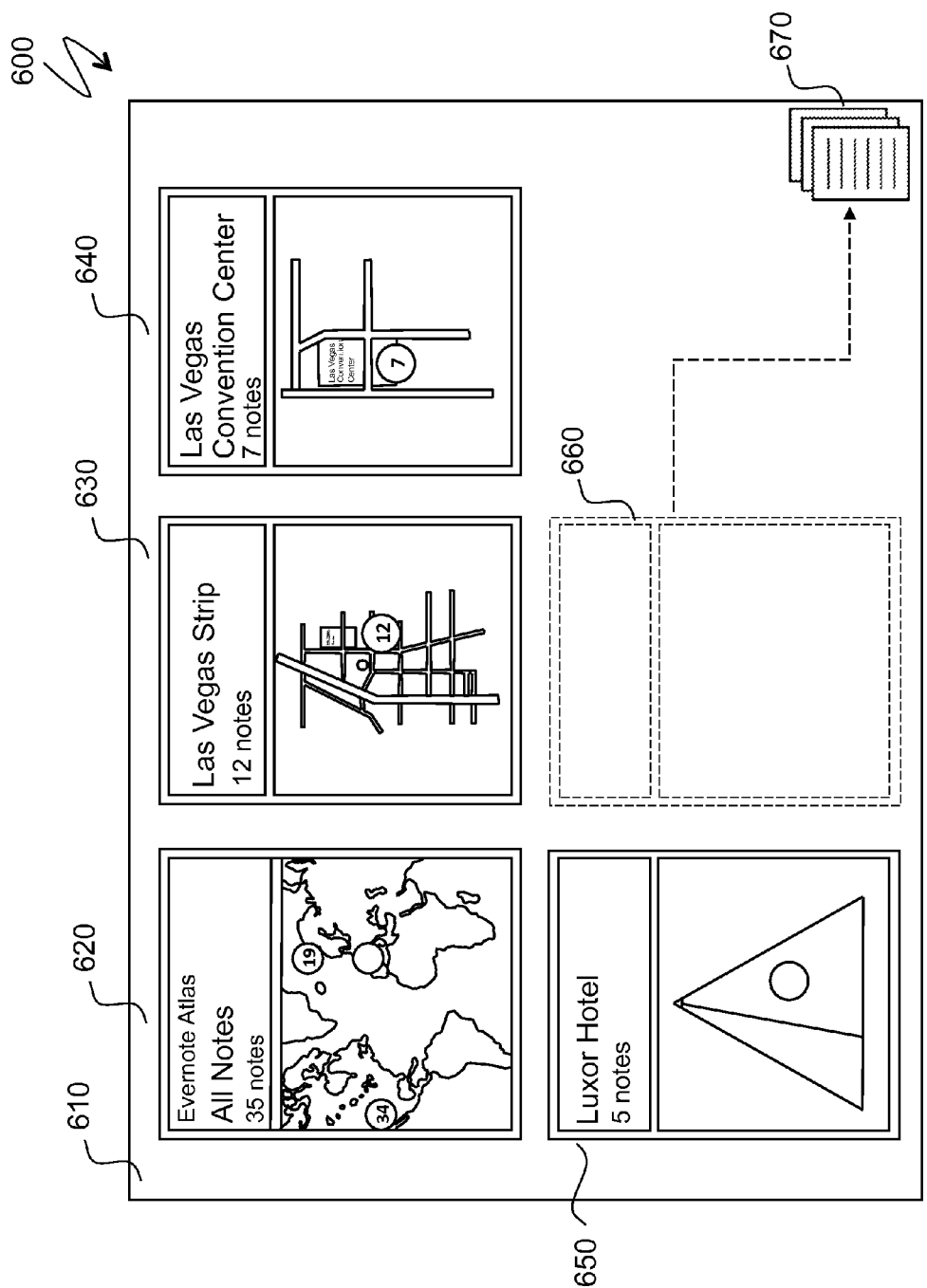
FIG. 6 is a schematic illustration of a note atlas built from a POI hierarchy and of hidden atlas cards, according to an embodiment of the system described herein.

FIG. 6 is a schematic illustration 600 of a note atlas built from a POI hierarchy and possibly from hidden atlas cards. An atlas 610 is opened with a world card 620, succeeded by POI cards (rather than city cards in previous illustrations) at two levels. A second level for the atlas 610, immediately following the world level, is a Las Vegas Strip card 630 with a cluster of twelve notes. The resolution level on the card 630 may be insufficient to show finer clustering details without compromising display quality, so the system may display the next level and the subsequent clustering on two cards 640, 650 where the set of twelve notes may be split into a cluster of seven notes taken at the Las Vegas Convention Center and a cluster of five notes taken at the Luxor Hotel (Pyramid). Some of the atlas cards may be hidden, as shown by a ghost card 660 (shown in FIG. 6 for illustration purposes and not necessarily displayed in the atlas) and a stack of hidden atlas cards 670, which may be manipulated, opened to activate the atlas, searched, etc., and may be provided in a bottom corner of the atlas.

Figure 7:
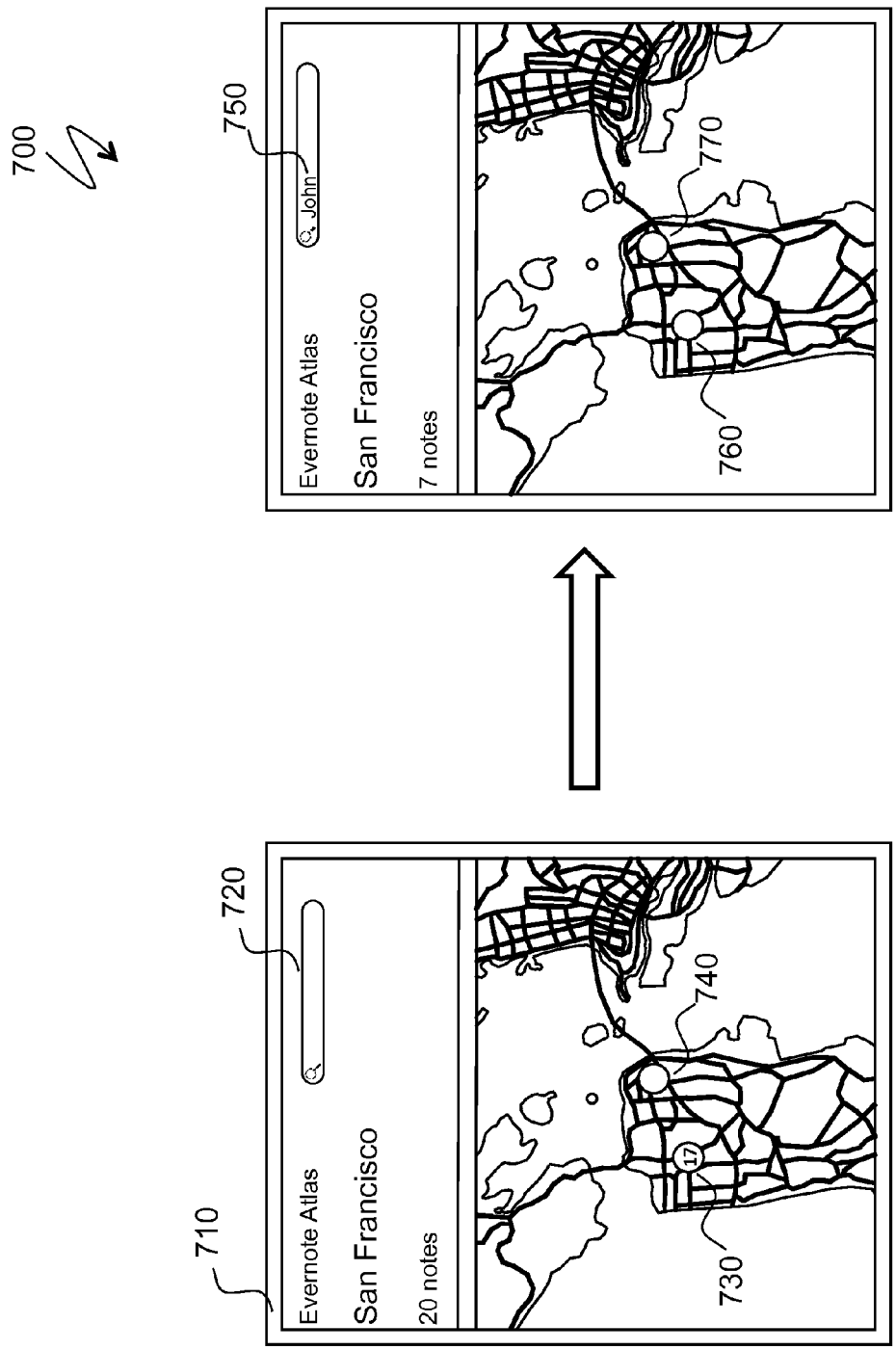
FIG. 7 schematically illustrates an effect of filtering of notes via a search on an atlas card, according to an embodiment of the system described herein.

FIG. 7 is a schematic illustration 700 showing an effect of searching on an atlas card. A note atlas 710 has a search field 720 allowing a display of note quantities for a set of notes belonging to the card location-wise and additionally filtered via a search. Original quantities of notes in two clusters 730, 740 are modified when a search term 750 is entered; new reduced quantities 760, 770 are shown on the card side-by-side with the search query.

FIG. 8A is a schematic illustration 800 of a manual addition of note locations on a map. A map 810 chosen by a user allows direct pointing 820 of a note location (which may be implemented via a screen touch, a mouse click, etc.) after a note is selected. This results in a pin shown in the corresponding location. Thus, a text note 830 is pinned to a location 840 on the map, while an image note 850 is pinned to a location 860. Obviously, multiple note selection and assigning a common location to a group of notes may also be done.

FIG. 8B is a schematic illustration 865 of a manual addition of a custom POI. A map 870 of Washington, D.C. is displayed to a user who defines a custom POI by drawing an area 880 on the map 870 using a drawing tool 890 that may be supplied by the system. Subsequently, the user may have an opportunity to name the custom POI (such as, for example, "My hiking route" or "My favorite shopping place") and the name may be included in the POI hierarchy and potentially in the main geographical hierarchy.

Figure 9:
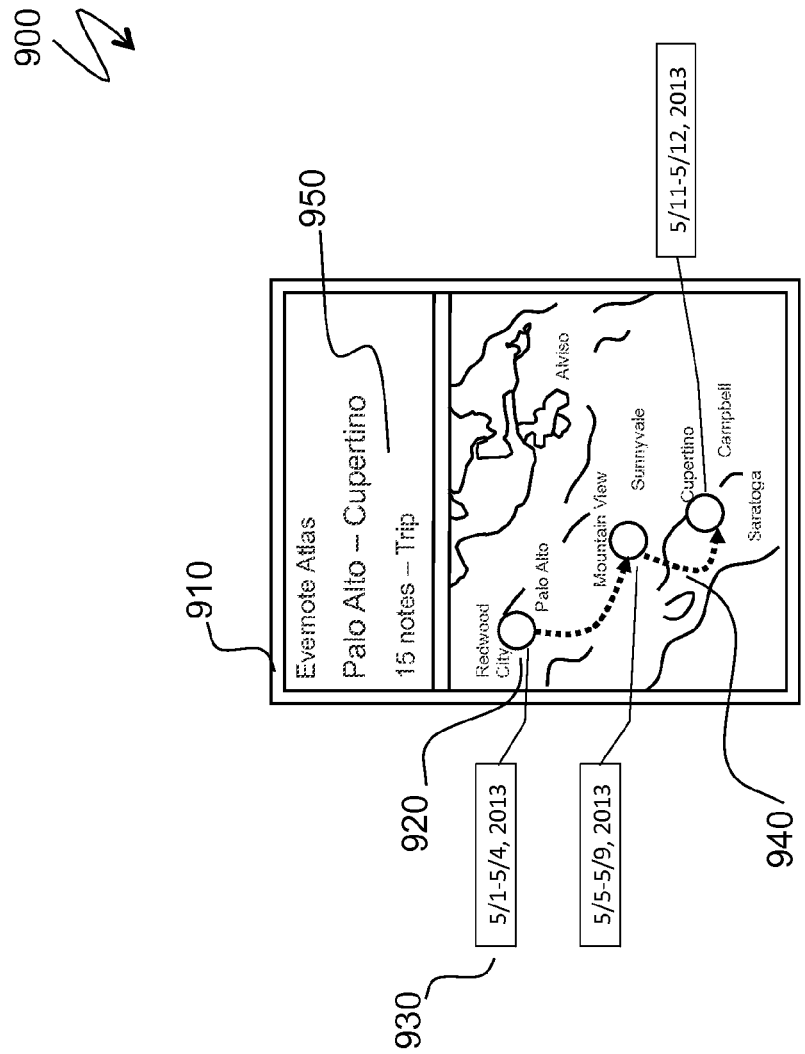
FIG. 9 is a schematic illustration of detecting and displaying of a user trip on a note atlas, according to an embodiment of the system described herein.

FIG. 9 is a schematic illustration 900 of a dynamic mapping—specifically, of detecting and displaying of a user trip on a note atlas. A card 910 displays a portion of the Silicon Valley in Calif. with three note clusters 920 (the connector is pointed at the first of these clusters with seven notes; two other clusters have subsequently four and five notes). The system uses time stamps on the notes, schematically illustrated by date ranges 930 (three date ranges are shown on FIG. 9) to derive from adjacent dates that a person has been traveling northwest-to-southeast, from Redwood City to Mountain View to Cupertino, which might be a business trip, visiting friends or other type of travel. The system may then connect the clusters on an atlas card into a trip via connectors 940, add a trip qualification 950 to the card header and display corresponding information on the card 910; optionally, a user approval of a result of dynamic mapping may be requested by the system.

Figure 10:
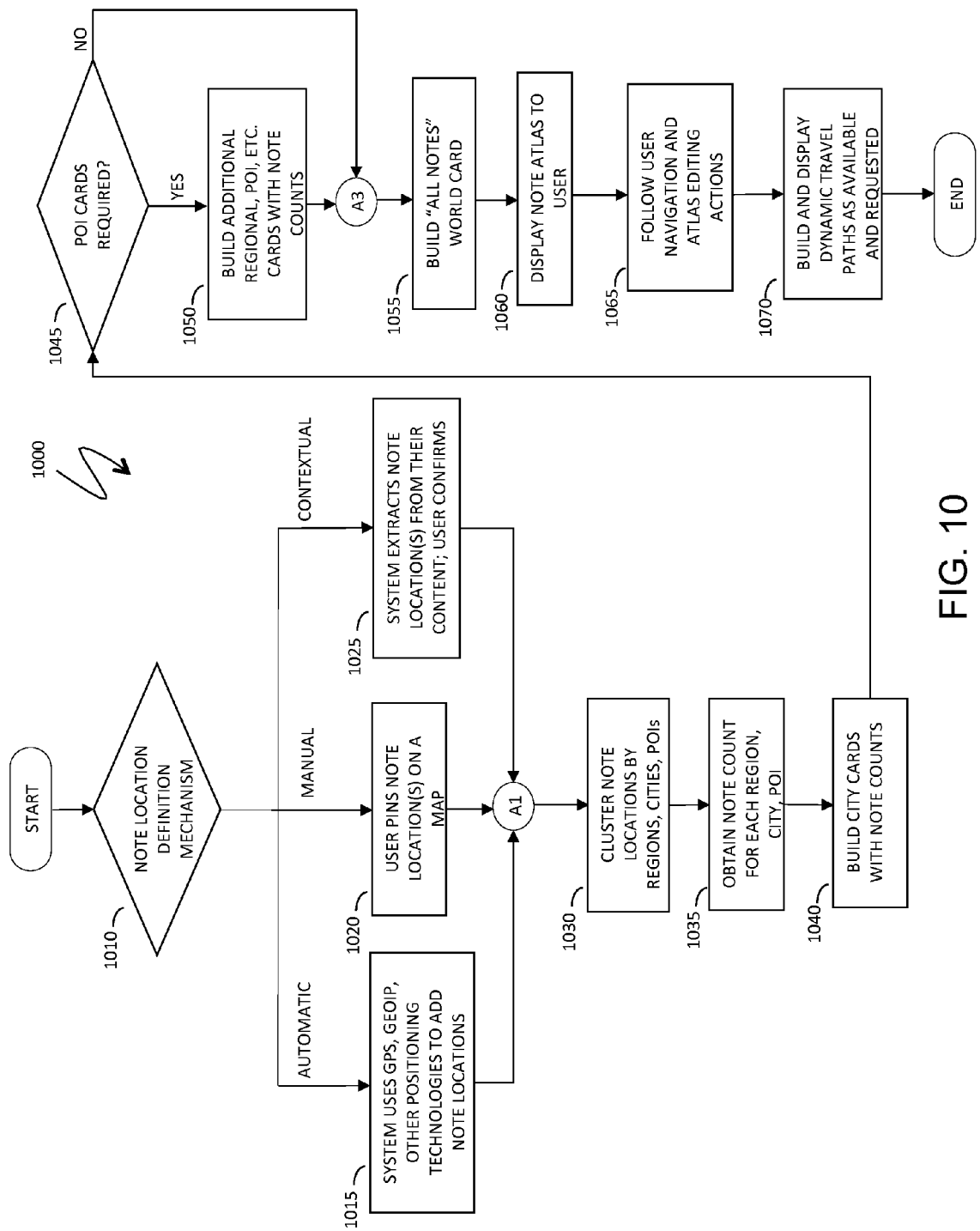
FIG. 10 is a principal system flow diagram according to an embodiment of the system described herein.

Referring to FIG. 10, a flow diagram 1000 illustrates system functioning and shows a principal system workflow for different steps and scenarios described elsewhere herein. Processing begins at a test step 1010 where a note location definition mechanism is determined for diverse notes in a notebook. The mechanism may be different for different notes. If it is determined that note location is defined automatically, processing proceeds to a step 1015 where the system uses GPS, GeoIP and/or other positioning technologies to add note locations, as explained in more details in conjunction with the FIG. 1. After the step 1015, processing proceeds to a step 1030. If it is determined at the test step 1010 that the location may be entered manually, processing proceeds to a step 1020 where the user pins note locations on a map provided by the system along with the necessary tools, as explained in more details in conjunction with FIGS. 1, 8A. After the step 1020, processing proceeds to the step 1030, which may also be reached independently from the step 1015. If it is determined at the test step 1010 that the location definition method is contextual, processing proceeds to a step 1025 where the system semi-automatically extracts note locations, where possible, from the note content. Optionally, the user is presented with the results and may be requested to confirm or discard the results. After the step 1025, processing proceeds to the step 1030, which may also be reached independently from the steps 1015, 1020.

After locations of all feasible notes in a notebook are defined through the steps 1010, 1015, 1020, 1025, then at the step 1030, note locations are clustered by regions, cities and POIs following predefined and user defined LOD hierarchies. After the step 1030, processing proceeds to a step 1035 where the note count for each cluster is calculated. After the step 1035, processing proceeds to a step 1040 where city cards with note counts are built. After the step 1040, processing proceeds to a test step 1045 where it is determined whether the POI cards must also be built. If so, processing proceeds to a step 1050 where additional POI, regional and other cards are built with corresponding note counts to display notes in a correct hierarchy. After the step 1050, processing proceeds to a step 1055. If it is determined at the test step 1045 that additional POI cards are not required, processing proceeds directly to the step 1055 which may also be reached from the step 1050.

At the step 1055, a world card is built for the atlas where all clusters may be maximally enlarged and assigned to select map locations with a least possible LOD. After the step 1055, processing proceeds to a step 1060 where a note atlas is displayed to the user, including possible landmark iconic images, world, city and POI levels, etc. After the step 1060, processing proceeds to a step 1065 where the system follows user navigation and atlas editing actions, which may include, but are not necessarily limited to, the following: zooming atlas cards and accessing notes corresponding to cards, as explained elsewhere herein in conjunction with FIG. 4; searching through atlas cards as explained in conjunction with FIG. 7; hiding and un-hiding portions of the atlas as explained in conjunction with FIG. 6; and defining custom POIs as explained on FIG. 8B and re-building the atlas.

After the step 1065, processing proceeds to a step 1070 where dynamic travel paths are built and user trips are displayed as available and when requested by the user, as explained in more details in conjunction with FIG. 9. After the step 1070, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of presenting database items, comprising:
   providing a plurality of clusters, wherein each of the clusters is formed by grouping database items according to location information associated therewith when the database items are created by a user and wherein the database items are provided by an application having functionality corresponding to at least one of: cloud-based content management, mobile content management, and desktop content management;
   creating a plurality of atlas cards based on the clusters, wherein the atlas cards represent a plurality of geographical levels of detail and wherein each of the atlas cards corresponds to at least one of: points of interest and natural location areas of the database items; and
   presenting the atlas cards to the user using a note atlas that represents all of the atlas cards corresponding to a set of the database items, wherein indicators of corresponding clusters are provided with each of the atlas cards.

2. A method, according to claim 1, wherein a quantity of database items is provided with each of the corresponding clusters.

3. A method, according to claim 1, wherein the note atlas shows at least three levels of detail corresponding to a world level of detail, a points of interest level of detail and a city level of detail.

4. A method, according to claim 3, wherein points of interest are determined by having a user provide points of interest on at least one of the atlas cards.

5. A method, according to claim 3, wherein the world level of detail includes a first one of the atlas cards for the entire world that corresponds to all of the database items and at least a second one of the atlas cards for a particular city that corresponds to a cluster containing at least one of the database items for the particular city.

6. A method, according to claim 3, wherein the note atlas includes an additional viewing pane that shows a navigable and zoomable version of at least one of the atlas cards and shows clusters of database items corresponding to locations of the at least one of the atlas cards.

7. A method, according to claim 6, wherein the additional pane provides direct access to database items.

8. A method, according to claim 7, wherein a user selecting a particular one of the database items causes a content management application that manages the database items to open.

9. A method, according to claim 1, wherein at least some of the atlas cards show a landmark with an iconic image corresponding to location information associated with the atlas cards.

10. A method, according to claim 1, wherein at least some of the atlas cards are at least partially hidden when viewing the note atlas.

11. A method, according to claim 1, wherein at least some of the atlas cards are searchable to provide a subset of the atlas cards corresponding to the search.

12. A method, according to claim 1, wherein maps are provided on the atlas cards.

13. A method, according to claim 12, wherein the natural location areas include cities.

14. A method, according to claim 1, wherein the database items correspond to notes having location information and wherein the location information is provided using at least one of: manual entry, automatic entry, and semi-automatic entry based on content of the notes.

15. A method, according to claim 14, wherein manual entry is provided by having a user select a location on a particular one of the atlas cards different from the atlas cards based on the cluster after selecting at least one database item.

16. A method, according to claim 1, wherein clusters corresponding to a particular sequence of times and having locations that correspond to a user travelling from a first location to a second location are grouped together and interconnected to form a user trip.

17. A method, according to claim 16, wherein user approval is solicited for at least one of the user trips.

18. A method, according to claim 1, wherein the application is a user contact management system.

19. A method, according to claim 1, wherein the application is a user note management system.

20. A non-transitory computer-readable storage medium containing software that presents database items, the software comprising:
   executable code that provides a plurality of clusters, wherein each of the clusters is formed by grouping database items according to location information associated therewith when the database items are created by a user and wherein the database items are provided by an application having functionality corresponding to at least one of: cloud-based content management, mobile content management, and desktop content management;
   executable code that creates a plurality of atlas cards based on the clusters, wherein the atlas cards represent a plurality geographical levels of detail and wherein each of the atlas cards corresponds to at least one of: points of interest and natural location areas of the database items; and
   executable code that presents the atlas cards to the user using a note atlas that represents all of the atlas cards corresponding to a set of the database items, wherein indicators of corresponding clusters are provided with each of the atlas cards.

21. A non-transitory computer-readable medium, according to claim 20, wherein a quantity of database items is provided with each of the corresponding clusters.

22. A non-transitory computer-readable medium, according to claim 20, wherein the note atlas shows at least three levels of detail corresponding to a world level of detail, a points of interest level of detail and a city level of detail.

23. A non-transitory computer-readable medium, according to claim 22, wherein points of interest are determined by having a user provide points of interest on at least one of the atlas cards.

24. A non-transitory computer-readable medium, according to claim 22, wherein the world level of detail includes first one of the atlas cards for the entire world that corresponds to all of the database items and at least a second one of the atlas cards for a particular city that corresponds to a cluster containing at least one of the database items for the particular city.

25. A non-transitory computer-readable medium, according to claim 22, wherein the note atlas includes an additional viewing pane that shows a navigable and zoomable version of at least one of the atlas cards and shows clusters of database items corresponding to locations of the at least one of the atlas cards.

26. A non-transitory computer-readable medium, according to claim 25, wherein the additional pane provides direct access to database items.

27. A non-transitory computer-readable medium, according to claim 26, wherein a user selecting a particular one of the database items causes a content management application that manages the database items to open.

28. A non-transitory computer-readable medium, according to claim 20, wherein at least some of the atlas cards show a landmark with an iconic image corresponding to location information associated with the atlas cards.

29. A non-transitory computer-readable medium, according to claim 20, wherein at least some of the atlas cards are at least partially hidden when viewing the note atlas.

30. A non-transitory computer-readable medium, according to claim 20, wherein at least some of the atlas cards are searchable to provide a subset of the atlas cards corresponding to the search.

31. A non-transitory computer-readable medium, according to claim 20, wherein maps are provided on the atlas cards.

32. A non-transitory computer-readable medium, according to claim 31, wherein the natural location areas include cities.

33. A non-transitory computer-readable medium, according to claim 20, wherein the database items correspond to notes having location information and wherein the location information is provided using at least one of: manual entry, automatic entry, and semi-automatic entry based on content of the notes.

34. A non-transitory computer-readable medium, according to claim 33, wherein manual entry is provided by having a user select a location on a particular one of the atlas cards different from the atlas cards based on the cluster after selecting at least one database item.

35. A non-transitory computer-readable medium, according to claim 20, wherein clusters corresponding to a particular sequence of times and having locations that correspond to a user travelling from a first location to a second location are grouped together and interconnected to form a user trip.

36. A non-transitory computer-readable medium, according to claim 35, wherein user approval is solicited for at least one of the user trips.

37. A non-transitory computer-readable medium, according to claim 20, wherein the application is a user contact management system.

38. A non-transitory computer-readable medium, according to claim 20, wherein the application is a user note management system.

* * * * *